(12) United States Patent
Hodjat

(10) Patent No.: US 7,437,808 B2
(45) Date of Patent: Oct. 21, 2008

(54) METHOD OF FORMING A METAL MATRIX COMPONENT

(75) Inventor: Yahya Hodjat, Oxford, MI (US)

(73) Assignee: The Gates Corporation, Denver, CO (US)

(*) Notice: Subject to any disclaimer, the term of this patent is extended or adjusted under 35 U.S.C. 154(b) by 635 days.

(21) Appl. No.: 11/057,551

(22) Filed: Feb. 14, 2005

(65) Prior Publication Data

US 2006/0179655 A1 Aug. 17, 2006

(51) Int. Cl.
| | |
|---|---|
| B07B 13/00 | (2006.01) |
| B21F 45/00 | (2006.01) |
| B21K 1/42 | (2006.01) |
| B23D 17/00 | (2006.01) |
| B30B 9/32 | (2006.01) |
| A47J 17/18 | (2006.01) |
| B65B 13/18 | (2006.01) |
| F02B 75/06 | (2006.01) |
| F16F 15/12 | (2006.01) |

(52) U.S. Cl. .................. 29/4.51; 29/403.1; 29/403.2; 29/892; 74/574.4; 100/34; 123/192.1; 241/166

(58) Field of Classification Search .............. 29/4.51, 29/403.1, 403.2, 888.08, 892, 892.1, 892.11, 29/892.3; 474/178; 74/574.4; 241/166; 100/34, 901; 123/192.1; 75/765, 770
See application file for complete search history.

(56) References Cited

U.S. PATENT DOCUMENTS

| | | | |
|---|---|---|---|
| 4,105,457 A | 8/1978 | Pietsch et al. ................. 106/78 |
| 4,585,475 A | 4/1986 | Fosnacht ..................... 75/51.2 |
| 5,088,399 A | 2/1992 | Cacace et al. ............... 100/218 |
| 5,169,588 A * | 12/1992 | Estepp .................. 264/331.17 |
| 5,186,742 A | 2/1993 | Hoffman et al. .............. 75/773 |
| 5,312,858 A * | 5/1994 | Folsom ....................... 524/435 |
| 5,468,291 A * | 11/1995 | Waterson et al. ............ 106/697 |
| 5,543,235 A | 8/1996 | Mirchandani et al. ....... 428/547 |
| 5,912,403 A | 6/1999 | Bilke .......................... 75/773 |
| 6,255,377 B1 * | 7/2001 | Hamami ..................... 524/439 |
| 6,743,275 B1 | 6/2004 | Cobett ......................... 75/572 |
| 7,297,720 B2 * | 11/2007 | Meyers et al. ................. 521/40 |
| 2004/0166974 A1 | 8/2004 | Hodjat ........................ 474/94 |
| 2006/0086207 A1 * | 4/2006 | Swenson ..................... 75/765 |

FOREIGN PATENT DOCUMENTS

| | | |
|---|---|---|
| DE | 24 37 590 A1 | 2/1976 |
| JP | 02 100000 | 4/1990 |

\* cited by examiner

*Primary Examiner*—David P Bryant
*Assistant Examiner*—Alexander P Taousakis
(74) *Attorney, Agent, or Firm*—J. A. Thurnau, Esq.; J. L. Mahurin, Esq.; P. N. Dunlap, Esq.

(57) ABSTRACT

A method of forming a metal matrix component and product that comprises forming scrap sheet metal material, shredding the scrap sheet metal material to a predetermined size range, filling the shredded scrap sheet metal material into a compacting die, adding an adhesive material to the shredded scrap sheet metal material in the compacting die, compressing the shredded scrap sheet metal material and curing the adhesive to form a metal matrix component. The product comprises an inertia ring that may be used in a crankshaft damper.

6 Claims, 4 Drawing Sheets

METHOD OF FORMING A METAL MATRIX COMPONENT

FIELD OF THE INVENTION

The invention relates to a method of forming a metal matrix component, and more particularly to a method of forming a metal matrix component by use of scrap metal material that is compacted and bound together by an adhesive.

BACKGROUND OF THE INVENTION

Automotive pulleys are conventionally made by spinning sheet metal using a number of different processes known in the industry. However, for crankshaft dampers, in many cases the mass of the crankshaft damper pulley must be greater than that provided by ordinary sheet metal pulleys. Greater mass is required to give the required amount of inertia to damp crankshaft vibrations.

Conventionally, greater mass is achieved by using a cast iron pulley instead of a spun sheet metal pulley. The problem with cast iron is that due to its manufacturing process, i.e., casting in sand, it has to be machined to achieve the desired net shape. Machining is an expensive operation. In addition, machined grooves for a multi-ribbed pulley have a higher surface roughness than a spun part due to the existence of machining marks, namely, grooves. Furthermore, machining exposes porosities which are inherent in the iron casting. The sharp edges of the exposed porosities are detrimental to a belt running in the pulley grooves.

Machining the pulley grooves also cuts through the grains, creating a weaker structure than spinning or flow forming which flows the grain structure and also reduces the grain size and crystalline dislocation, creating a much stronger part. This is also referred to as work hardening.

Further, flow formed sheet metal parts can only be made to a certain thickness both economically and practically. This limit is up to about 5 mm of sheet metal thickness.

Methods are known for utilizing scrap in the recycling of materials to their raw state, but not to manufacture durable, functional, and net-shaped products.

Representative of the art is U.S. Pat. No. 4,585,475 to Fosnacht (1986) which discloses a method for recycling oily mill scale.

What is needed is a method of forming a metal matrix component and product using scrap metal material that is compacted and bound together by an adhesive. The present invention meets this need.

SUMMARY OF THE INVENTION

The primary aspect of the invention is to provide a method of forming a metal matrix component and product using scrap metal material that is compacted and bound together by an adhesive.

Other aspects of the invention will be pointed out or made obvious by the following description of the invention and the accompanying drawings.

The invention comprises a method of forming a metal matrix component and product that comprises forming scrap sheet metal material, shredding the scrap sheet metal material to a predetermined size range, filling the shredded scrap sheet metal material into a compacting die, adding an adhesive material to the shredded scrap sheet metal material in the compacting die, compressing the shredded scrap sheet metal material and curing the adhesive to form a metal matrix component.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

The invention comprises a metal matrix component, such as an inertia ring, that can be used in a product such as a damper pulley. The damper pulley utilizing the metal matrix component has all of the required physical attributes including sufficient inertia and strength present in prior art damper pulleys, but is less costly to manufacture.

The invention utilizes scrap metal material that is a by-product of a metal manufacturing process, for example, as a by-product of a sheet metal pulley manufacturing process. The inventive process can be used to manufacture a component that can be used in a primary or secondary crankshaft damper.

A primary damper comprises a pulley with an inertia ring attached to the pulley by way of a damping member. The pulley and hub are a rigid structure.

A secondary damper comprises a pulley and inertia ring which is bound to a hub only through an elastomeric damping member. The primary or secondary damper is attached to an engine crankshaft to damp crankshaft vibrations.

Figure 1:
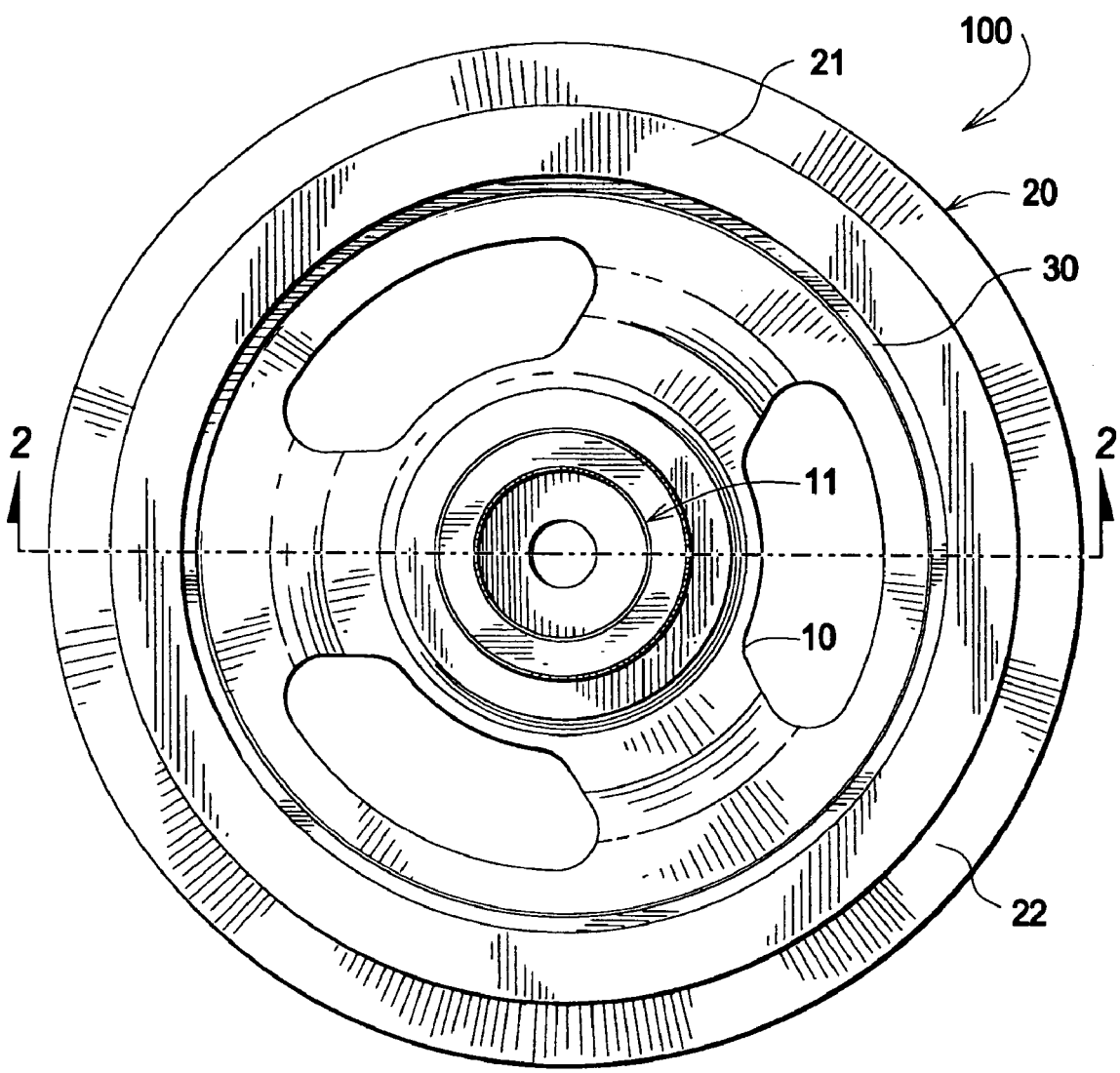
FIG. 1 is a front elevation view of a secondary crankshaft damper.

FIG. 1 is a front elevation view of a secondary crankshaft damper. Crankshaft damper 100 comprises a hub 10 which is engaged with a combined pulley/inertia ring 20 through an elastomeric damper member 30. Damper member 30 is disposed between the hub and pulley/inertia ring.

The elastomeric damper member 30 is used to damp internal combustion engine crankshaft vibrations. The damper is connected to an engine crankshaft through hub portion 11 using fasteners known in the art such a screw or bolt.

Figure 4:
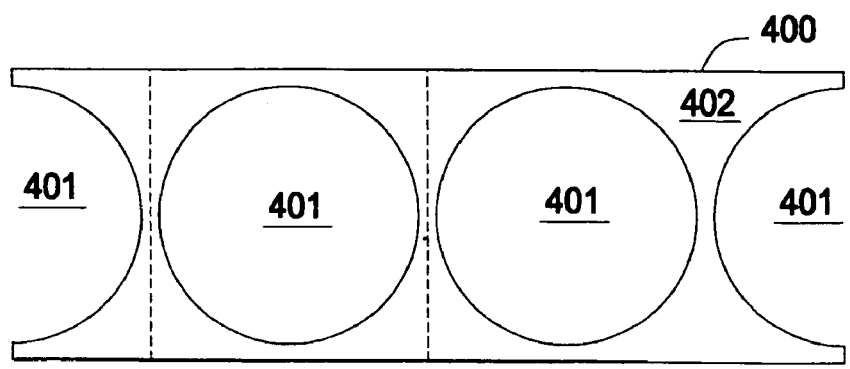
FIG. 4 is a plan view of a sheet metal strip with pulley blanks stamped out.

During fabrication of the crankshaft damper, pulley/inertia ring 20 initially comprises a round sheet metal blank that is cut or stamped from a coil and is subsequently spun formed to form a pulley as desired, see FIG. 4. Methods of spin forming round sheet metal blanks into various shapes and forms are well known in the art.

During the cutting or stamping process a waste stream of sheet metal material representing approximately 25% offal is scraped and ultimately sold to mills for re-melting at a relatively low cost. To reduce or eliminate this significant waste stream, the instant inventive process fully utilizes this suitable but previously unused scrap material.

Figure 2:
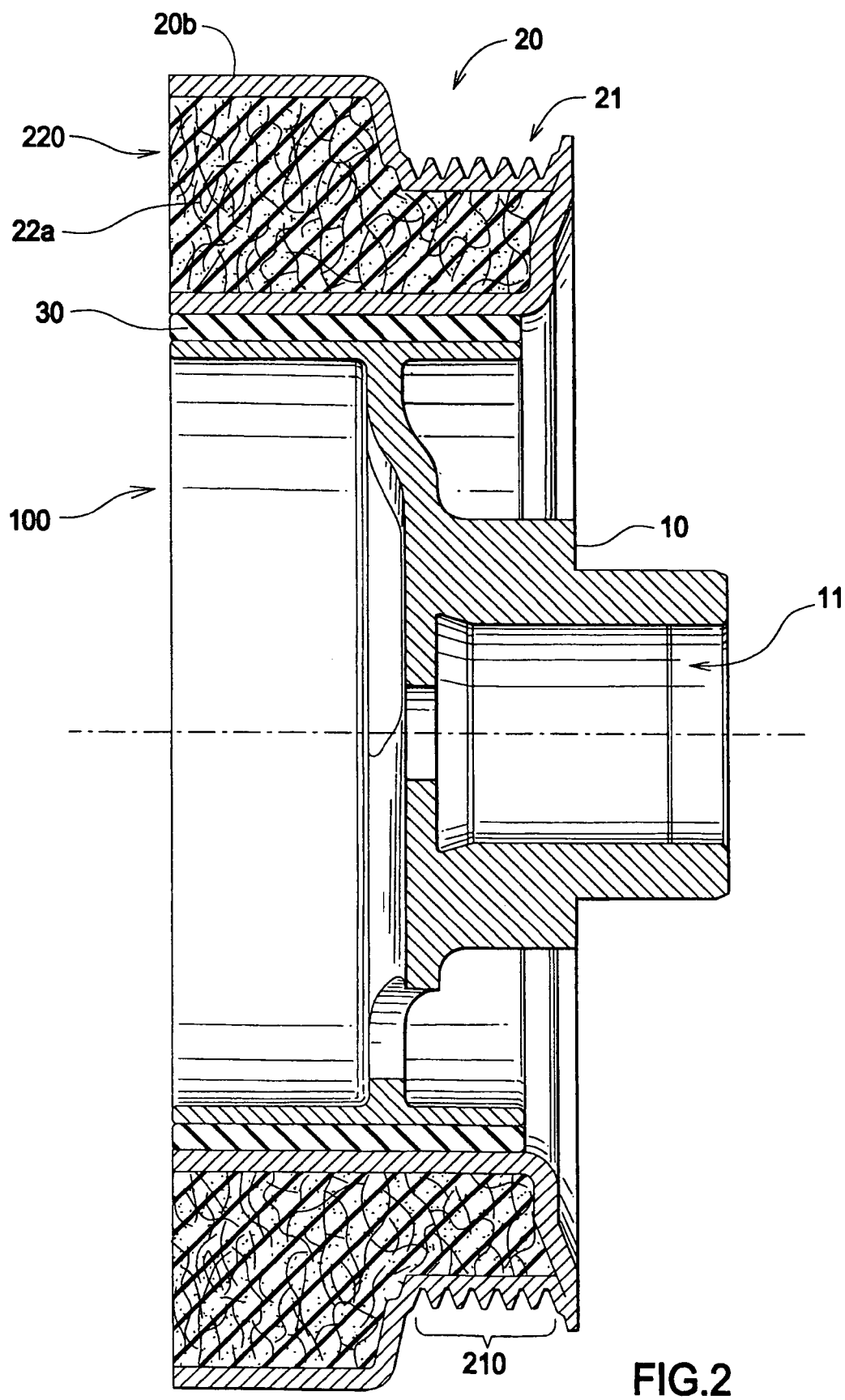
FIG. 2 is a cross-sectional view of the crankshaft damper in FIG. 1.

FIG. 2 is a cross-sectional view of an inventive crankshaft damper. The process uses stamped sheet steel to make a damper pulley of suitable inertia. The scrap steel generated from the sheet steel stamping process used to make the pulley, namely, during cutting a round blank from a steel coil strip, is reused to make the inertia ring component 22a. Receiving portion 220 in sheet metal portion 20b receives component 22a. Component 22a comprises inertia substantially equivalent to a component made of cast iron or steel.

Figure 3:
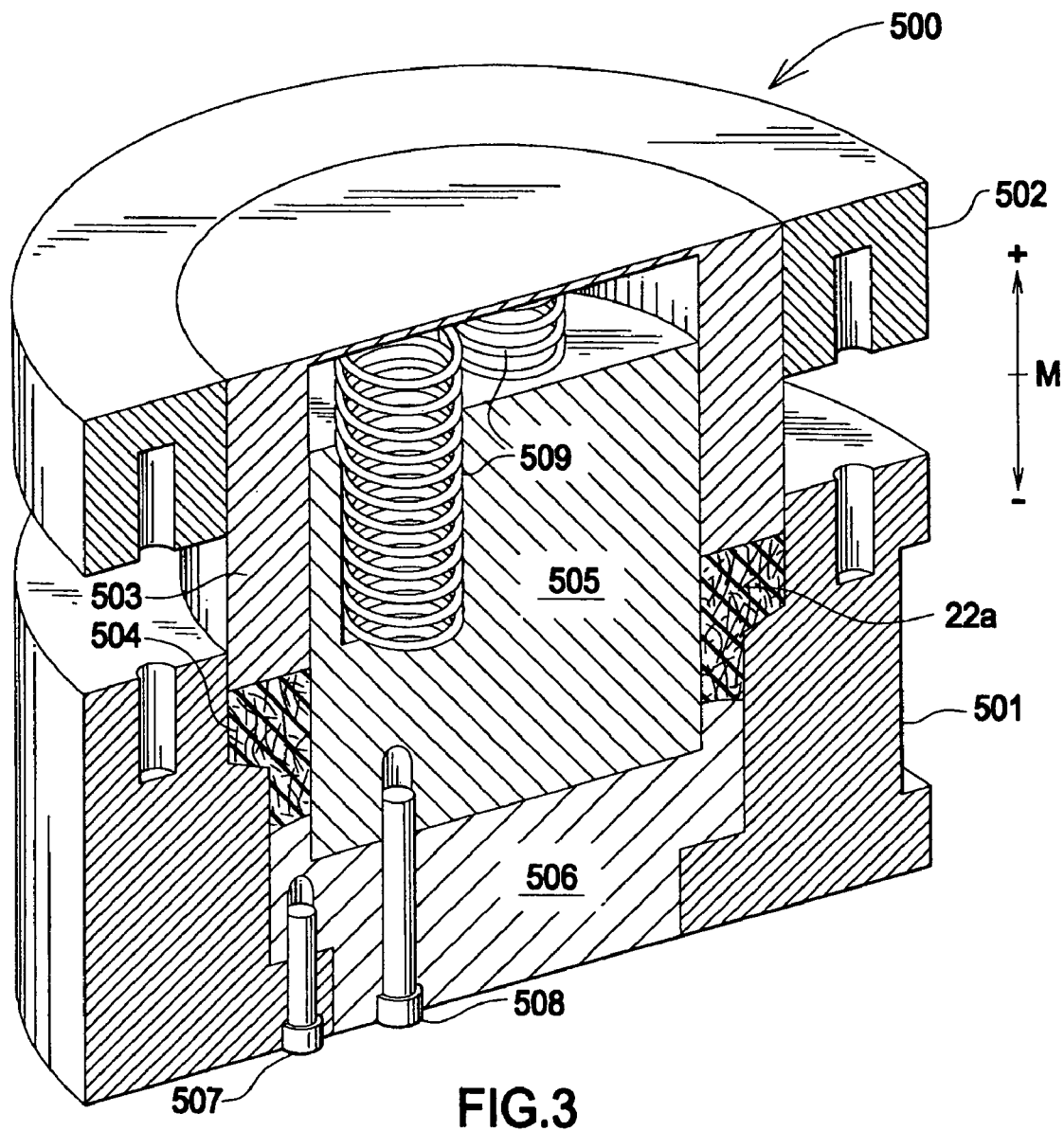
FIG. 3 is a perspective view of a compacting die.

The inventive process comprises the following steps:

a) A sheet metal blank is stamped or cut from a sheet metal coil strip. The sheet metal blank is flow formed or spun formed using known methods to form pulley/inertia ring sheet metal portion 20b. The inventive process may be used in the fabrication of any rotating component in addition to a pulley or hub and therefore is not limited to the description given here. A receiving portion 220 is formed in the pulley/inertia ring portion 20b to receive the metal matrix component 22a. Portion 21 comprises a multi-ribbed profile 210 for engaging a multi-ribbed belt. Scrap steel material is created as a result of the stamping or cutting process. FIG. 4 is a plan view of a sheet metal strip 400 with pulley blanks 401 stamped out. Scrap metal material 402, "offal", is generated in all stamping processes where a round, arcuate or otherwise non-rectangular part (for example a pulley, damper, gear, cap, etc.) is stamped from the strip of sheet or plate metal. The offal usually represents approximately 20 to 25% of the virgin sheet metal strip material, although this amount can vary according to the shape of the part being stamped or cut. The offal is traditionally sent back to steel mills to be recycled by melting.

b) The scrap metal material 402 from step "a" is shredded using known processes to form particles having a predetermined size in the range of, for example, approximately 2 mm to 4 mm, although this range may be varied to include approximately +0 mm up to approximately 6 mm particles. The dimensions are offered only as examples since the shredded material does not have to be dimensionally homogeneous and can vary in size and volume so as long as the shredded metal particles are not too long or too wide for the intended component. Hence, the appropriate particle size is ultimately determined by the size and shape of the part to be fabricated using the inventive process. Once the shredded scrap metal material is formed it may be used in a number of different embodiments. In an alternate embodiment the metal material may be obtained from any source so long as the metal material has the requisite size. This includes metal material purpose produced for this application. However, the greatest benefit of the invention is realized by using metal material from the related fabrication waste stream.

c) Once formed, the shredded scrap metal material is weighed and filled into a compacting die, for example using vibratory feeders which evenly distribute the shredded scrap metal particles throughout the die. Vibratory feeding evenly distributes the mass as well, which aids in producing a properly balanced component, thereby minimizing or eliminating the need for further balancing of the component.

d) An adhesive in liquid, gel or powder form is mixed or added to the shredded scrap metal material in the compacting die. FIG. 3 is a perspective view of the compacting die. Die 500 comprises a first part 501. Part 502 comprises an annulus 503 which nests within part 501, and more particularly within cavity 504. Part 501 also comprises internal parts 505 and 506. The configuration of parts 501, 505 and 506 form cavity 504. Parts 501, 505 and 506 are pinned together by pins 507 and 508 as shown. Cavity 504 in the instant invention has an annular form which is substantially matched by annulus 503. Annulus 503 has a sliding engagement in directions +M and −M between part 501 and part 505 in order to allow an axial movement −M of part 502 in order to compress scrap metal material 22a, namely, part 502 is rammed into part 501 in direction −M during compaction of material 22a. Once compaction is complete, part 502 is separated from part 501 in direction +M with the assistance of torsion springs 509. Compacted ring 22a and part 505 are ejected from die part 501 by an axial movement +M of part 506 once part 502 is retracted. Component 22a is then separated from part 505.

e) The shredded scrap metal material particles are compressed under a high press tonnage in the compacting die using processes known in the art to form a metal matrix component 22a, for example, an inertia ring. In an alternate method, the adhesive may be added after the shredded scrap metal material is compacted. The shape of cavity 504 and hence of compacted component 22a is selected to allow insertion into a receiving portion 220 in pulley/inertia ring 20b, see FIG. 2.

f) The adhesive is then cured by heating of the die and the compressed material thereby cementing the shredded scrap metal material particles together to form the metal matrix component 22a. The adhesive encapsulates the shredded scrap metal material particles to prevent corrosion by permanently sealing them from the environment, depending upon the characteristics of the metal. The heating step does not require a heat sufficient to sinter the compacted material. The temperature need only cure the adhesive.

g) The metal matrix component 22a is then coated with the same adhesive used in step d) or another second adhesive on the surfaces that will be used to attach the component 22a to the stamped sheet metal pulley made in step "a", namely in receiving portion 220. This step may also be combined with step "f".

h) Component 22a is then press fit into the receiving portion 220 using known processes, see FIG. 2. See also component 22 in FIG. 5 and FIG. 6. Component 22 may be formed using the same process described herein for component 22a.

i) After component 22a is press fit into receiving portion 220, the second adhesive is then cured under high heat and/or pressure.

j) Pulley/inertia ring 20, containing the component 22a formed in step i), is then bonded to an elastomeric damping member 30, which in turn is bonded to a hub 10 to form a secondary crankshaft damper. In an alternate embodiment, a damper is formed whereby component 22a is directly engaged with a damping member 30, which member 30 is in turn attached to a fully formed pulley with hub, see following description l).

k) Crankshaft damper 100 is then connected to an engine crankshaft thought the hub by use of bolts, threads, flanges or splines at portion 11, see FIG. 1. Hub 10 may be formed using known stamping and spin forming processes, and therefore, any waste stream from the hub fabrication may also be used to provide the shredded metal particles used to fabricate component 22a or 22.

l) In lieu of step j), and following from step i), in an alternate embodiment fully formed component 22 is pressed into and bonded to a pulley with an elastomeric member 30 disposed between the component 22 and the pulley, wherein the pulley is fully formed comprising a web and hub. The combination thus comprising a complete primary damper, see FIG. 6. In yet another embodiment component 22 may be pressed into a cavity 201 formed in a pulley 200 without use of an elastomeric damping member, see FIG. 5.

The resulting product is a crankshaft damper having a metal matrix component with suitably high inertia that is much less expensive than crankshaft dampers having cast iron inertia rings while possessing many superior technical advantages.

The stamping and spinning process may also be used to fabricate the hub for the crankshaft damper. This results in the hub and the pulley being fabricated of sheet metal by stamping and spinning, while the metal matrix component inertia ring is fabricated using the scrap metal material derived from the fabrication of the hub and/or pulley, or other metal scrap waste stream. Of course, the scrap metal material may be obtained from other than the hub and pulley fabrication process, but, using the hub and pulley fabrication scrap material waste stream allows the cost savings and technical advantages to be fully realized over the prior art processes.

Most known adhesives, elastomers, and resins can be used for this invention. For example, suitable adhesives include, but are not limited, to cyanoacrylate adhesives, epoxy adhesives, acrylic adhesives, polyurethane adhesives, nylon resins, and phenolic resin which is a thermoset resin. All of the foregoing known adhesives are cured using known methods and processes.

A class of elastomers called "self-bonding" or "self-stick" that do not require adhesives for bonding to metals may be used to bond through oily metal surfaces while generating a very high bonding force, while also protecting the particles from corrosion permanently. Reference is made to copending U.S. application Ser. No. 10/081,464 filed Feb. 22, 2002, which application is incorporated herein in its entirety by reference. Self-bonding or self-stick elastomers are formulated to bond to metals in their curing stage without the use of adhesives. They become "self-stick" by adding adhesion promoters to the compound formulas. Some common elastomers that can be made self-stick by adding adhesion promoters to their mix include VAMAC, EVM, ACM and Butyl. Adhesion promoters include zinc acrylates (ZDMA, ZDA) and Ricobond (MAM).

It is preferable, but not necessary to the success of the inventive process, to use elastomers for member 30 which are all thermoset types. Thermoplastics may be used as well. Examples of suitable elastomers include natural rubber, EPDM, butyl, VAMAC®, polyurethane, HNBR, silicone Rubber and EVM.

The scrap material utilized in the inventive process may comprise any form of metallic material that may be used in the production of any metal product including but not limited to crankshaft damper inertia rings and pulleys. These include but are not limited to all forms of steels, including stainless steels, as well as aluminum. Of course, non-steel metallic materials such as bronze, iron, copper and so on may be used as the shredded metal material since the material only needs to be subject to being compacted, compatible with the adhesives, and have a sufficient mass to provide the necessary inertial characteristics. Hence, any suitable metal side stream from other manufacturing lines may be used to manufacture the shredded metal material metal matrix components. In addition non-metallic materials such as gravel, sand, crushed rock, glasses or other materials having a specific gravity greater than one (1) may be used.

Figure 5:
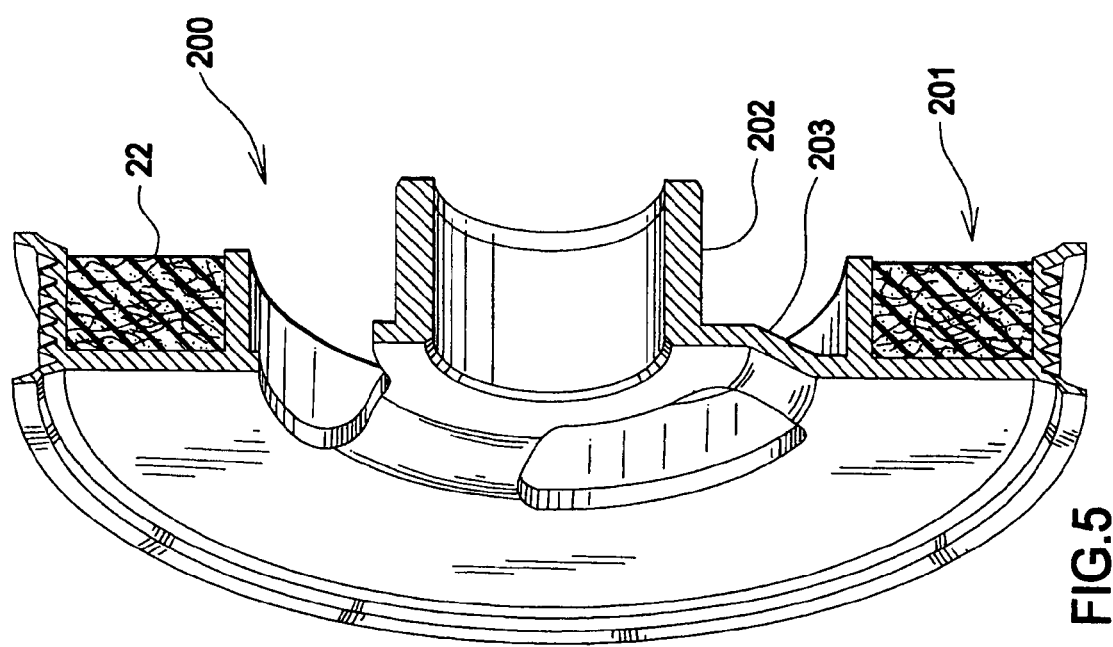
FIG. 5 is a cross-sectional view of a crankshaft damper.

In an alternate embodiment, the sheet metal material and adhesive may be poured directly into a cavity preformed in the sheet metal part if compaction of the shredded metal material is not needed. FIG. 5 is a cross-sectional view of a crankshaft damper 200 which depicts the shredded scrap metal material component 22 after having been poured into a cavity or receiving portion 201. After the sheet metal material is poured into the preformed cavity 201, adhesive is then added to the sheet metal material in the cavity. The adhesive is then cured to bond component 22 to the pulley. In this embodiment it is not necessary to compress the material. Further, the adhesive may be added to material 22*a* before it is poured into the cavity. In another embodiment component 22, in a fully compressed state as described in steps "a" thru "f", is pressed into cavity 201. Damper or pulley 200 also comprises a hub 202 and web 203.

Figure 6:
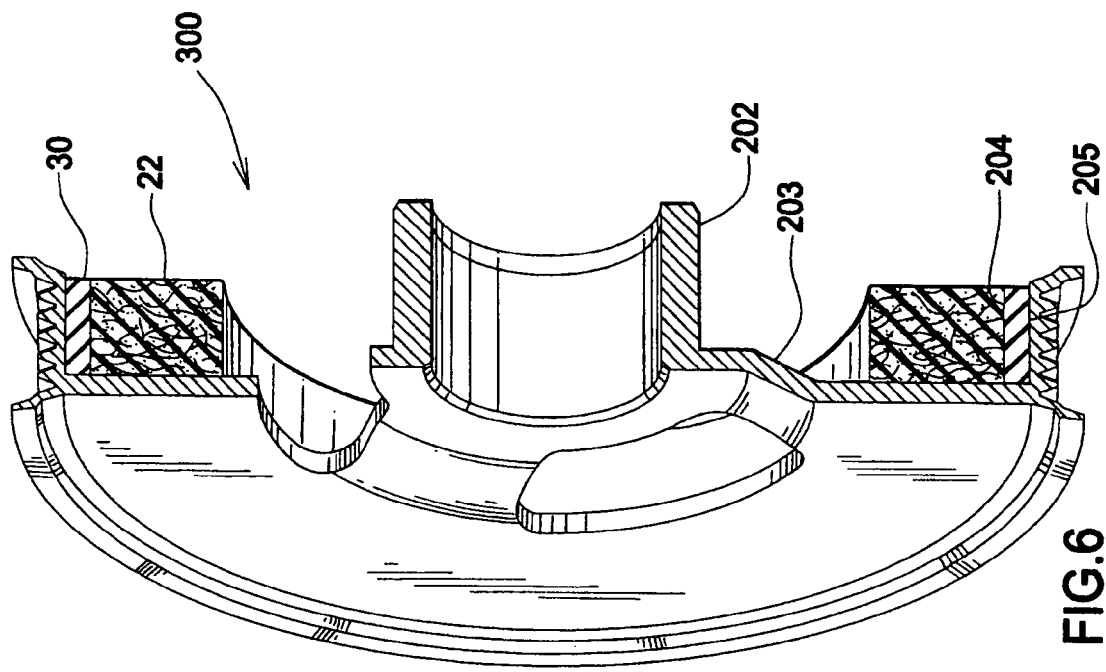
FIG. 6 is a cross-sectional view of a crankshaft damper.

In yet another embodiment shown in FIG. 6, a fully compressed component 22 as formed in steps "a" thru "f" is pressed into and bonded to elastomeric member 30 using an adhesive as described elsewhere in this specification. In this embodiment no cavity is formed to receive component 22. In order to keep component 22 in place during operation, its diameter is selected so that it gives a slight interference fit with the inner surface 204 of elastomeric member 30. Elastomeric member 30 is bonded using adhesives described herein to the inner surface 205 of the pulley. Component 22 may also be pressed against web 203 for added stability, but, it is not bonded to the web in order for component 22 to have freedom of movement as it damps vibrations. As described earlier, the adhesive is cured once component 22 is pressed into place. In each of the foregoing embodiments, pulley 200 and 300 are each formed using spin forming processes described elsewhere in this specification.

The inventive process results in a net-shaped, high inertia metal matrix component for use in a crankshaft damper. "Net-shaped" refers to a completed part which has no further need for further machining to clean up dimensional variances, essentially producing a finished product.

Advantages of the invention include a lower relative cost than a cast iron machined inertia ring because purchased material is reused and fewer manufacturing steps are required. The spun formed grooves are stronger than cut grooves of castings because the spin forming process flows the material grains in the ribbed portion 210, see FIG. 2, rather than cutting through them in the machining process. Further, work hardening resulting from flow forming improves the strength of formed pulleys. The inventive pulleys promote longer belt life due to the smoother surface finish of the formed metal. The inventive process pulleys also lack surface porosities which can initiate corrosion related failures. Further, utilization of metal scrap results in an environmentally responsive manufacturing by avoiding the expenditure of more energy (fuel) that would otherwise be used to reprocess the scrap at a mill.

The product manufactured using the inventive process can be used to produce automotive and non-automotive crankshaft dampers. It can also be used in any other application where a metal matrix, high inertia, rotating or non-rotating component is required.

The inventive process can also use scrap metal to manufacture many products that require high mass, net-shape components at a lower cost through simpler processing and a more environmentally friendly manner than using virgin raw materials. The inventive process achieves this goal without recycling the material to its raw form.

Although forms of the invention have been described herein, it will be obvious to those skilled in the art that variations may be made in the process and construction and relation of parts without departing from the spirit and scope of the invention described herein.

I claim:

1. A method of forming a metal matrix component comprising:

shredding metal material to a predetermined size range;

filling only the shredded metal material into a compacting die;

adding an adhesive to the shredded metal material;

compressing the shredded metal material in the compacting die to form a metal matrix component; and curing the adhesive.

2. The method as in claim 1 further comprising:

forming the shredded metal material using a by-product of cutting a sheet metal part.

3. The method as in claim 1 further comprising:

forming the shredded metal material using a by-product of fabrication of a metal part.

4. The method as in claim 1 further comprising:

using a particle size range of the shredded metal material of approximately +0 mm to approximately 6 mm in diameter.

5. The method as in claim 1 further comprising:

coating a surface of the metal matrix component with a second adhesive;

bonding the metal matrix component to a pulley with the second adhesive;

bonding the pulley to an elastomeric damping member; and bonding the elastomeric damping member to a hub, the elastomeric damping member disposed between the pulley and the hub.

6. The method as in claim 1 further comprising:

coating a surface of the metal matrix component with a second adhesive; and bonding the metal matrix component to a pulley with the second adhesive.

* * * * *